United States Patent
Aldropp et al.

[15] 3,645,557
[45] Feb. 29, 1972

[54] FOLDABLE RETRACTABLE STEP ASSEMBLY FOR CAMPERS AND LIKE VEHICLES

[72] Inventors: Art Aldropp; Archie Aldropp, both of P.O. Box 95, Langlois, Oreg. 97450

[22] Filed: Mar. 25, 1970

[21] Appl. No.: 22,593

[52] U.S. Cl. .............................................. 280/166, 182/88
[51] Int. Cl. ............................................................. B60r 3/02
[58] Field of Search ................... 280/166; 296/62; 182/88, 95, 182/156

[56] References Cited

UNITED STATES PATENTS

| 63,458 | 4/1867 | Baker | 280/166 |
| 2,142,949 | 1/1939 | Linker | 280/166 |
| 560,752 | 5/1896 | Prator et al. | 296/62 |
| 3,515,406 | 6/1970 | Endsley, Jr. | 280/166 |

FOREIGN PATENTS OR APPLICATIONS

| 105,817 | 11/1938 | Australia | 280/166 |

Primary Examiner—Kenneth H. Betts
Assistant Examiner—Robert R. Song
Attorney—Eugene D. Farley

[57] ABSTRACT

A foldable retractable step assembly for campers and like vehicles comprises a bracket with means for attachment to a structural support member of a camper. At least one step and riser, preferably a plurality of steps and risers, are suspended on the bracket. Pivotal mounting means with associated stop means pivotally mount the upper end of the upper riser on the bracket and the upper ends of the subsequent risers on the outer ends of the adjacent steps. Pivotal mounting means mount the inner ends of the steps on the lower ends of the risers. The steps and risers thus are alternately adjustable between an extended use position, and a folded, nesting, transport position underlying the bracket. Retracting means are associated with the bracket which enable retraction of the folded assembly beneath the support when the assembly is in transport position.

1 Claims, 2 Drawing Figures

Patented Feb. 29, 1972  3,645,557
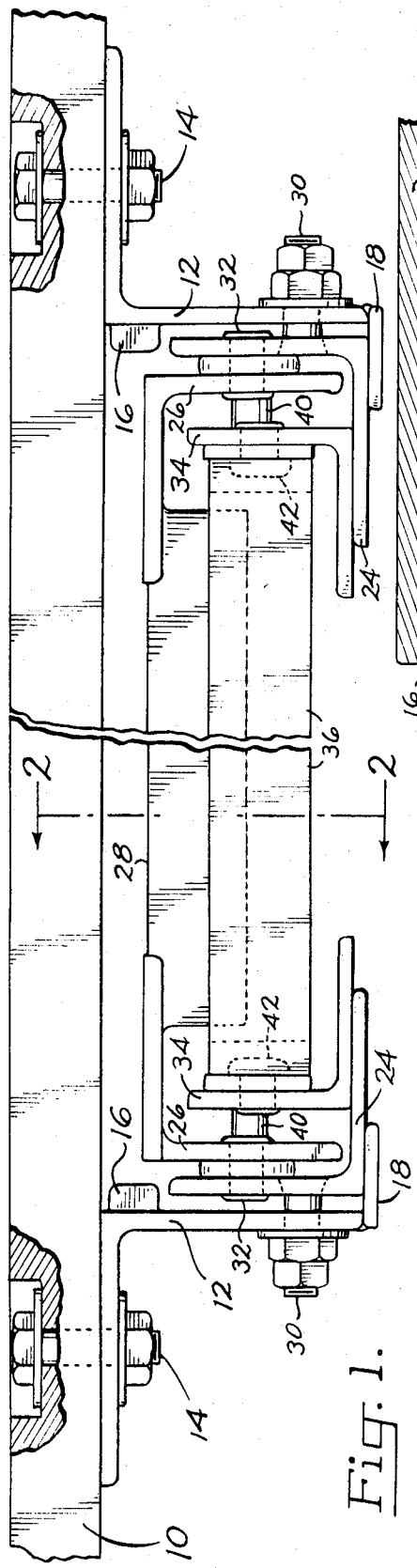
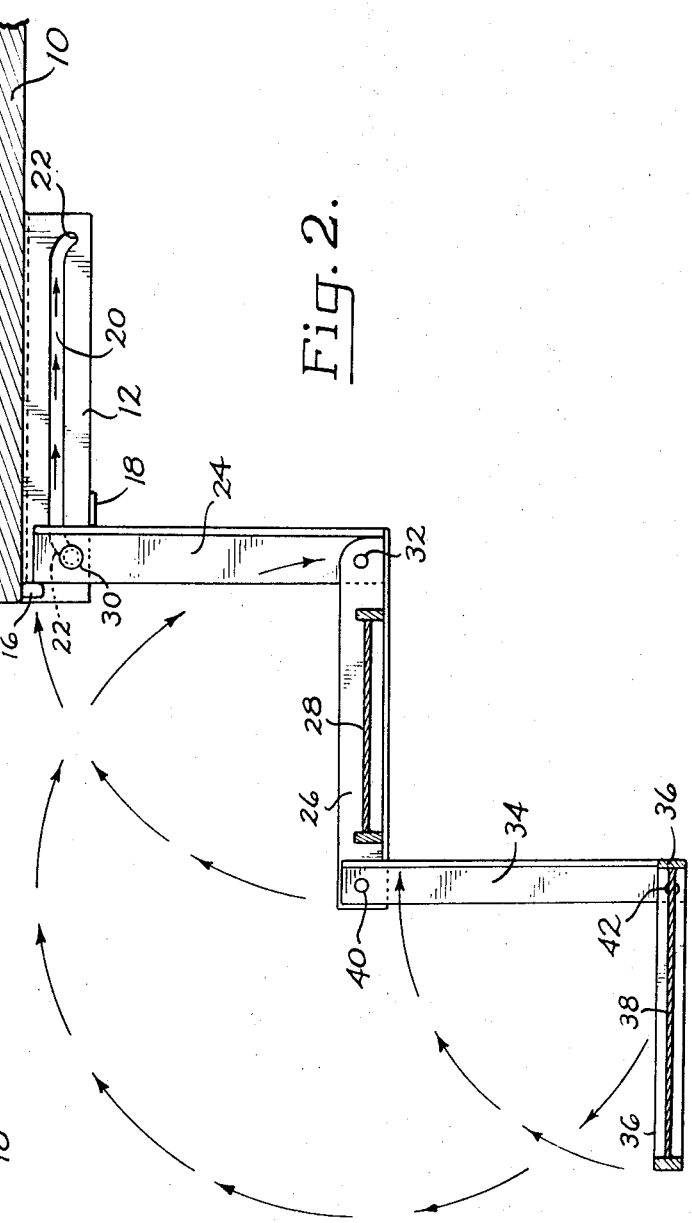
Art Aldropp
Archie Aldropp
INVENTORS

FOLDABLE RETRACTABLE STEP ASSEMBLY FOR CAMPERS AND LIKE VEHICLES

This invention relates to foldable and retractable step assemblies for use on vehicles, particularly on campers, trucks and trailers.

The use of camper bodies mounted on pickup trucks is attended by the disadvantage that the camper body is located such a great distance from the ground that steps are required to enter and leave the camper. Fitting the camper with such steps presents a problem in that the steps should be conveniently retractable into a transport position but conveniently extendable to a secure use position when the camper is to be occupied.

Another difficult problem is presented by reason of the fact that camper bodies, the trucks on which they are mounted, and various trailer types differ widely in construction so that it is difficult to provide step assemblies which are applicable universally to all of them.

Accordingly it is the general object of the present invention to provide a foldable retractable step assembly for campers and like vehicles which assembly is easily adjustable between folded and unfolded positions; easily shifted when folded between extended and retracted storage positions; out of the way when the camper is in motion; universal in its application to campers, trucks, and trailers of varying design; easily installed; light in weight; strong enough to support safely the usual loads to which such step assemblies customarily are subjected; easily modified in design to accommodate a range of step elevations; and simple and inexpensive to manufacture.

In the drawings:

FIG. 1 is a view in front elevation of the foldable, retractable step assembly of our invention illustrated in its folded, retracted condition.

FIG. 2 is a transverse, longitudinal, sectional view taken along line 2—2 of FIG. 1 and illustrating the step assembly in its unfolded, extended, use position, and illustrating further the manner of folding it up.

Generally stated, the foldable retractable step assembly of our invention comprises a bracket equipped with means for attachment to a structural support member of a camper. At least one step and riser are mounted below the bracket by means of a pivotal mounting with associated stops. The upper end of the riser is pivoted to the bracket while the inner end of the step is pivoted to the outer end of the riser. The step and riser thus are adjustable between an extended use position, braced by the stops, and a folded, nesting, storage position. Retracting means permit retracting the assembly in its folded condition to a location beneath the camper, where it is secured pending its next use.

Considering the foregoing in greater detail and with particular reference to the drawings:

The numeral 10 indicates schematically the floor or other structural component of a camper, truck, or trailer, immediately beneath a door with which the step assembly is to be associated.

The step assembly is supported on bracket means with comprise a pair of parallel, longitudinally extending angle irons 12. These are fastened to the floor 10 by suitable means such as bolts 14.

The projecting leaf of angle iron bracket 12 is provided with a first abutment or stop 16 located adjacent its upper, outer margin, and a second abutment or stop 18 extending inwardly of its lower margin.

Bracket 12 further is provided with a longitudinally extending slot 20 which preferably is turned downwardly at each of its terminal portions to provide pockets 22.

A first step and riser unit is pivotally mounted on bracket 12.

The riser preferably comprises a pair of angle irons 24. The step comprises a pair of angle irons 26 which nest within, or lap, angle irons 24 which constitute the risers. A step plate 28 is supported between angle irons 26.

In the application of the angle irons, one of their leaves serves to mount the pivoting elements which make possible folding the assembly. The other leaf provides the stop elements which lock the parts in their extended position and permit their use as a step.

To this end the upper end of each of risers 24 is provided with a pivot pin 30 which is received in one of slots 20. The lower end of each riser mounts a pivot pin 32 by means of which the riser pivotally is interconnected to the inner end of step angle iron 26.

It will be noted that in the FIG. 2 extended position of the step assembly, riser 24 is braced by abutments or stops 16 and 18. However, the associated step is braced by abutment of the angle iron leaves.

This construction enables extension of the step assembly to any desired length, as required to span the distance between the camper body and the ground. In the illustrated form of the invention, it has been extended by the inclusion of a second riser and associated step.

The second riser includes a pair of angle irons 34 and the second step comprises a metal frame 36 which supports a step pad 38.

In this case, also, the angle irons serve the dual functions of mounting the pivotal members and serving as stops. Thus one leaf of each of angle irons 34 laps the corresponding leaf of angle iron 26 to which it pivotally is connected by means of a pivot pin 40. The lower end of each angle iron 34 laps frame 36 to which it is pivotally interconnected by means of a pivot pin 42.

The necessary stops are provided by the other leaf of angle irons 34, the upper end of which engages the corresponding cutaway leaf of angle iron 26 and the lower end of which engages the upper edge of box frame 36 of the lowermost step.

In the use of the step assembly, it is possible to fold all the steps into the compact, nesting, folded condition illustrated in FIG. 1. This is accomplished by folding the extended step elements in the manner indicated by the arrows of FIG. 1.

All of the steps and risers then telescope together, or nest, their component angle irons serving the ancillary but important function of containing the folded members so that a compact assembly is formed which may be aligned with slots 20 in brackets 12. Pins 30 then may be lifted out of outermost pockets 22 in which they are received, and the entire folded assembly slid longitudinally the length of slot 20 until pins 30 drop into the innermost pockets 22. The folded assembly then is supported by bearing engagement of the pins in innermost pocket 22, as well as by bearing engagement of angle irons 24 with the upper surfaces of stops 18 which thus serve a dual purpose.

During movement of the vehicle, the steps are out of the way and do not create a safety hazard, nor are they subject to damage. When it is desired to use the steps again, the reverse procedure is employed; the compact folded assembly is withdrawn along slot 20 until pins 30 are received in the outermost of pockets 22. The steps and risers then are unfolded, thereby placing the assembly in its operative, use condition.

Having thus described out invention in preferred embodiments, we claim:

1. A folding, retractable step assembly for entering a door of a camper or the like, the step assembly comprising:
   a. a pair of laterally spaced brackets each having a longitudinal slot,
   b. attaching means for attaching the brackets to a structural support member of the camper,
   c. a pair of laterally spaced first angle iron risers one inward of each bracket, one leaf of each riser being parallel to its associated bracket and the other leaf of each riser projecting inward toward each other from the inner side of said one leaf,
   d. a pivot on each first riser slidably engaging the slot in the associated bracket for movement of the first risers between a retracted position within and parallel to the brackets and an extended position projecting downward from the front end of the brackets, e. a pair of stop members on each bracket spaced apart vertically and longitudinally for engaging opposite sides of the associated first riser in the extended position of the latter while permitting the first risers to slide between them to and from said retracted position, f. a pair of laterally spaced first angle iron step supports one inward of each first riser, one leaf of each step support being parallel to said one leaf of the associated first riser and the other leaf of each step support projecting inward toward each other from the inner end of said one leaf, g. a pivot interconnecting the outer end of said one leaf of each first riser and the inner end of said one leaf of the associated first step support, h. the end of said other leaf of each first riser and associated first step support adjacent the interconnecting pivot being arranged for mutual abutment in the extended position of said step supports, i. a first step member supported between said other leaves of the step supports, j. a pair of laterally spaced second angle iron risers, one inward of each first step support, one leaf of each second riser being parallel to said one leaf of the associated first step support and the other leaf of each second riser projecting inward toward each other from the inner side of said one leaf, k. a pivot interconnecting the outer end of said one leaf of each first step support and the inner end of said one leaf of the associated second riser, l. said other leaf of each first step support terminating at its outer end inward of its associated one leaf and forming an abutment for the associated second riser in the extended position of the latter, and m. a second step member pivoted to the outer ends of the second risers, the inner end of the second step and the outer ends of the second risers being arranged for mutual abutment in the extended position of the second step, n. whereby the second step may be folded removably against said other leaves of said second risers, the second risers may be folded removably against said other leaves of said first step supports, and the first step supports may be folded removably against said other leaves of the first risers.

* * * * *